UNITED STATES PATENT OFFICE.

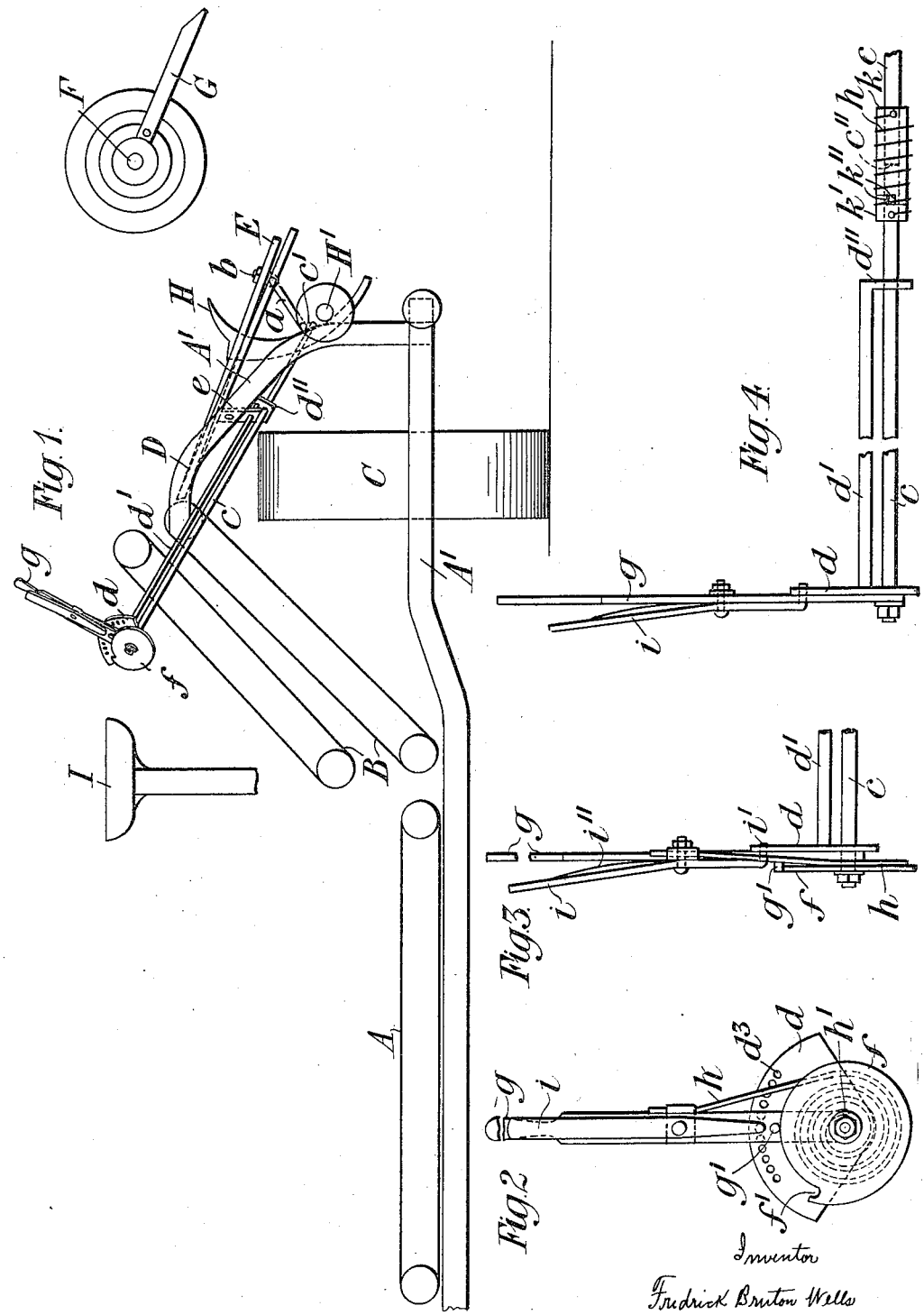

FREDRICK BRUTON WELLS, OF STEVENAGE, ENGLAND.

SHEAF-BINDER HARVESTING-MACHINE.

1,243,365.         Specification of Letters Patent.        Patented Oct. 16, 1917.

Application filed March 20, 1917. Serial No. 155,985.

*To all whom it may concern:*

Be it known that I, FREDRICK BRUTON WELLS, a subject of His Majesty the King of Great Britain, residing at Rush Green Farm, Langley, Stevenage, Herts, England, machinist, have invented certain new and useful Improvements in or Relating to Sheaf-Binder Harvesting-Machines; and I do hereby declare the following to be a full, clear, and exact description of the invention, such as will enable others skilled in the art to which it appertains to make and use the same.

This invention relates to improvements in sheaf binder harvesting machines whereby the driver is enabled to control the passage of the crop to the knotter or tying mechanism, and thus to regulate the delivery of the sheaves to the ground. This permits the sheaves in one row to be laid opposite to those in another row, thereby facilitating shocking or stooking.

At the present time the crop is usually delivered onto a hinged trip board, or its equivalent on the binding or tying platform, the free or delivery end of said board being held raised from said platform by a spring whose resistance is constant, and the crop cannot pass to the knotter or tying mechanism until the packers have gathered the crop into a sheaf of sufficient bulk to cause it to press the trip board down onto the binding platform against the resistance of the said spring.

According to my invention, I provide means whereby the normal spring resistance of the trip board to its depression by the crop may be increased, or counteracted or diminished, at will, by the driver while the machine is working, and whereby the driver can also when desired, positively depress the trip board.

I will now fully describe my invention and the manner or performing the same having reference to the accompanying drawings in which similar letters refer to corresponding parts in all the figures, and wherein:—

Figure 1 shows apparatus according to my invention applied to a sheaf binder harvesting machine, those parts not necessary for the clear understanding of the invention being omitted or merely diagrammatically indicated.

Fig. 2 is a detached end view of the rock shaft and its operating handle, showing the spring connection between the two.

Fig. 3 is a side elevation of Fig. 2.

Fig. 4 is a side elevation of a slightly modified construction.

A is the endless band or apron upon which the crop falls when cut and whereby it is conveyed to the endless bands B which lift it over the top of the main wheel C and deliver it to the binding platform D. E is the usual trip board hinged on the binding platform, whose delivery or lower end is normally held raised from said platform by a spring not shown in the drawings. F indicates the knotter shaft, G the arm of the knotter which ejects the bound sheaf from the binding platform, H a reciprocating packer, H' the packer shaft and I the driver's seat. All these parts are well known and need no further description in connection with the present invention.

I will now describe the means illustrated for increasing, or counteracting or diminishing, at will, the normal spring resistance of the trip board to its depression by the crop, and for positively depressing the trip board if required.

$a$ is a link pivotally connected at one end with a fitting $b$ on the trip board E and having its other end pivotally connected with a cranked arm $c'$ on one end of a rock shaft $c$, a suitable aperture being formed in the binding platform D for the passage of said link. The said rock shaft $c$ is carried in suitable bearings supported by the main frame A' and should be slidable longitudinally as regards these bearings, since the position of the tying mechanism relatively to the main frame is variable. As shown, a quadrant $d$ mounted freely on the upper end of the rock shaft $c$ has a stay rod $d'$ extending therefrom, which is slidable in a bearing in a bracket $e$ fixed to the main frame A', and has at its end a plate $d''$ which provides a bearing for the rock shaft.

On the upper end of the rock shaft is fixed the disk $f$, see Figs. 2 and 3, having a stop notch $f'$ formed on its periphery and adapted to be engaged by a stop $g'$ on the operating handle $g$ which latter pivots on the rock shaft adjacent to the said disk $f$ between the latter and the quadrant $d$ above mentioned. $h$ is a coiled spring one end of which is secured to the handle $g$ while the other end is fixed at $h'$ to the said disk $f$. $i$ is a locking lever pivoting on the operating handle and having a cranked finger $i'$ at its end adapted to be engaged with the holes $d^3$ in the quadrant $d$ by means of the spring $i''$. When the operating handle is in the central position, as seen in Fig. 2, the spring $h$ is neutral, and when the operating handle is moved over in either direction, the said spring imparts a torsional spring stress to the rock shaft $c$ causing the latter, through the link $a$, either to add this spring stress to the normal spring resistance of the trip board, or to thereby counteract or diminish such normal spring resistance.

As shown in the drawings, movement of the operating handle, Fig. 2, to the right increases the normal spring resistance of the trip board to its depression by the crop, while movement of the said handle to the left diminishes or counteracts this spring resistance. When the operating handle is moved right over to the left, its stop $g'$ engages with the stop notch $f'$ on the disk $f$ and the operating handle then positively turns the rock shaft $c$ and thus positively pulls down the trip board onto the binding platform.

By a modification, in lieu of arranging the spring $h$ between the operating handle and the rock shaft, I may divide the latter transversely and couple the divided portions by a helical spring, the operating handle being then fixed on the rock shaft and the disk $f$ dispensed with.

This arrangement is illustrated in Fig. 4. The rock shaft $c$ is divided transversely at $c''$. $k$ is a tubular member on one portion of the rock shaft which receives the end of the other portion of said shaft thereby keeping both portions in line, and $k'$ is a co-acting clutch member on the said other portion of the rock shaft. The clutch members are connected by the helical spring $h$, which is neutral when the handle $g$ is adjusted centrally of the quadrant $d$, and by moving the said handle $g$ over in either direction, the normal spring resistance of the trip board is obviously increased, or counteracted or diminished, owing to the torsional spring stress thereby imparted to the portion of the rock shaft $c$ which connects with the link $a$. When the operating handle is moved fully over in the direction to counteract the normal spring resistance of the trip board, stops $k''$ on the clutch members come into engagement and the divided portions of the rock shaft turn solidly together, positively depressing the trip board.

I am aware it has been proposed to provide an attachment for sheaf binder harvesting machines, consisting of a lever adapted to be operated by the driver and connected with a cranked rod supported near the driving mechanism, and adapted to disengage the stop arm of the shipping or trip lever from the shipping pinion, thereby enabling the driver to release at will any corn from the delivery table or binder deck.

What I claim and desire to secure by Letters Patent of the United States is:—

1. In a sheaf binder harvesting machine, the combination with a spring elevated trip board, of a rock shaft having one of its ends movably connected to said trip board, a disk fixed to the opposite end of said rock shaft, an operating lever pivoted on said rock shaft adjacent said disk, and a spring coiled about said rock shaft and having its ends respectively connected to said disk and said operating handle.

2. In a sheaf binder harvesting machine, the combination with a spring elevated trip board, of a rock shaft having one of its ends movably connected to said trip board, a disk fixed to the opposite end of said rock shaft, an operating lever pivoted on said rock shaft adjacent said disk, a spring coiled about said rock shaft and having its ends respectively connected to said disk and said operating handle, and means for retaining said operating lever in adjusted position.

3. In a sheaf binder harvesting machine, the combination with a spring elevated trip board, of a rock shaft having one of its ends movably connected to said trip board, a disk fixed to the opposite end of said rock shaft, an operating lever pivoted on said rock shaft adjacent said disk, a spring coiled about said rock shaft and having its ends respectively connected to said disk and said operating handle, a stop carried by said operating lever, and said disk having a stop notch, adapted to coöperate with said stop whereby said disk and said lever may be positively moved in unison.

4. In a sheaf binder harvesting machine, the combination with a spring elevated trip board, of a rock shaft for actuating said trip board, a link pivotally connecting said trip board with one end of said shaft, a disk fixed to the opposite end of said shaft, an operating lever pivoting loosely about the shaft adjacent said disk, a spring coiled about the shaft between the lever and disk and having its end respectively connected with said lever and disk, a perforated quadrant adjacent said lever, and a spring pressed locking lever having a cranked finger to enter the perforations in the quadrant and hold the operating lever in adjusted position.

In testimony whereof I have hereunto set my hand in the presence of two witnesses.

FREDRICK BRUTON WELLS.

Witnesses:
SIDNEY J. THORNHILL,
ALBERT EDGAR ALEXANDER.

Copies of this patent may be obtained for five cents each, by addressing the "Commissioner of Patents, Washington, D. C."